(12) United States Patent
Baker et al.

(10) Patent No.: US 10,212,482 B1
(45) Date of Patent: Feb. 19, 2019

(54) USER INTERFACE, METHOD AND SYSTEM FOR MEDIA CONTENT

(71) Applicant: SiliconDust USA Inc., Pleasanton, CA (US)

(72) Inventors: Michael James Baker, Sunnyvale, CA (US); Nicholas John Kelsey, Milpitas, CA (US)

(73) Assignee: SiliconDust USA Inc., Pleasanton, CA (US)

( * ) Notice: Subject to any disclaimer, the term of this patent is extended or adjusted under 35 U.S.C. 154(b) by 0 days.

(21) Appl. No.: 15/353,143

(22) Filed: Nov. 16, 2016

Related U.S. Application Data

(60) Provisional application No. 62/256,019, filed on Nov. 16, 2015.

(51) Int. Cl.
  *H04N 21/482* (2011.01)
  *H04N 21/485* (2011.01)
  *H04N 21/81* (2011.01)

(52) U.S. Cl.
  CPC ....... *H04N 21/4825* (2013.01); *H04N 21/482* (2013.01); *H04N 21/485* (2013.01); *H04N 21/8133* (2013.01)

(58) Field of Classification Search
  CPC ............. H04N 21/4825; H04N 21/482; H04N 21/485; H04N 21/8133; H04N 21/4722
  See application file for complete search history.

(56) References Cited

U.S. PATENT DOCUMENTS

| | | | | |
|---|---|---|---|---|
| 2003/0177494 | A1* | 9/2003 | Satterfield | H04N 21/482 725/43 |
| 2004/0034867 | A1* | 2/2004 | Rashkovskiy | H04N 21/482 725/40 |
| 2006/0015907 | A1* | 1/2006 | Nakata | H04N 21/482 725/59 |
| 2010/0275231 | A1* | 10/2010 | Yi | H04N 21/482 725/44 |
| 2012/0194742 | A1* | 8/2012 | Barnes | H04N 21/482 348/569 |
| 2015/0042882 | A1* | 2/2015 | Park | H04N 21/482 348/570 |

* cited by examiner

*Primary Examiner* — Pankaj Kumar
*Assistant Examiner* — Alexander Boyd
(74) *Attorney, Agent, or Firm* — NovoTechIP International PLLC

(57) ABSTRACT

A system is configured to perform a method which is also disclosed, to provide a user interface. The user interface is presented as a visual overlay that provides options for selecting content, such as any audio and/or visual media, any streaming media, any live or other television or on demand show(s) or content that may be on a selected programming channel. The user interface may be configured for displaying a channel listing as a channel bar, and a show listing as tiles in an expanded listing area. The expanded listing area may include one or more current or future shows available via a selected channel.

21 Claims, 11 Drawing Sheets

USER INTERFACE, METHOD AND SYSTEM FOR MEDIA CONTENT

CROSS-REFERENCE TO RELATED APPLICATIONS

This application claims a benefit of priority to U.S. Provisional Patent Application No. 62/256,019, filed on Nov. 16, 2015, and entitled "USER INTERFACE, METHOD AND APPARATUS FOR MEDIA CONTENT," which is incorporated herein by reference in its entirety.

TECHNICAL FIELD

The disclosure relates generally to television and specifically to facilitating a user interface (UI) for selecting desired audio and/or video media content, which may be arranged as channels and/or shows.

BACKGROUND

Television and other media programming can be arranged in the form of discrete channels (which may be referred to as "programming channels"), each containing audio, video or other content. The content programming on a given channel may be organized in time-based increments referred to as shows. Thus, a channel may provide a stream of shows, each having a respective start time. A channel may in another arrangement provide a selection of shows, each available on demand.

Present user interfaces (UI's) for accessing and selecting channels and shows may be cumbersome.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
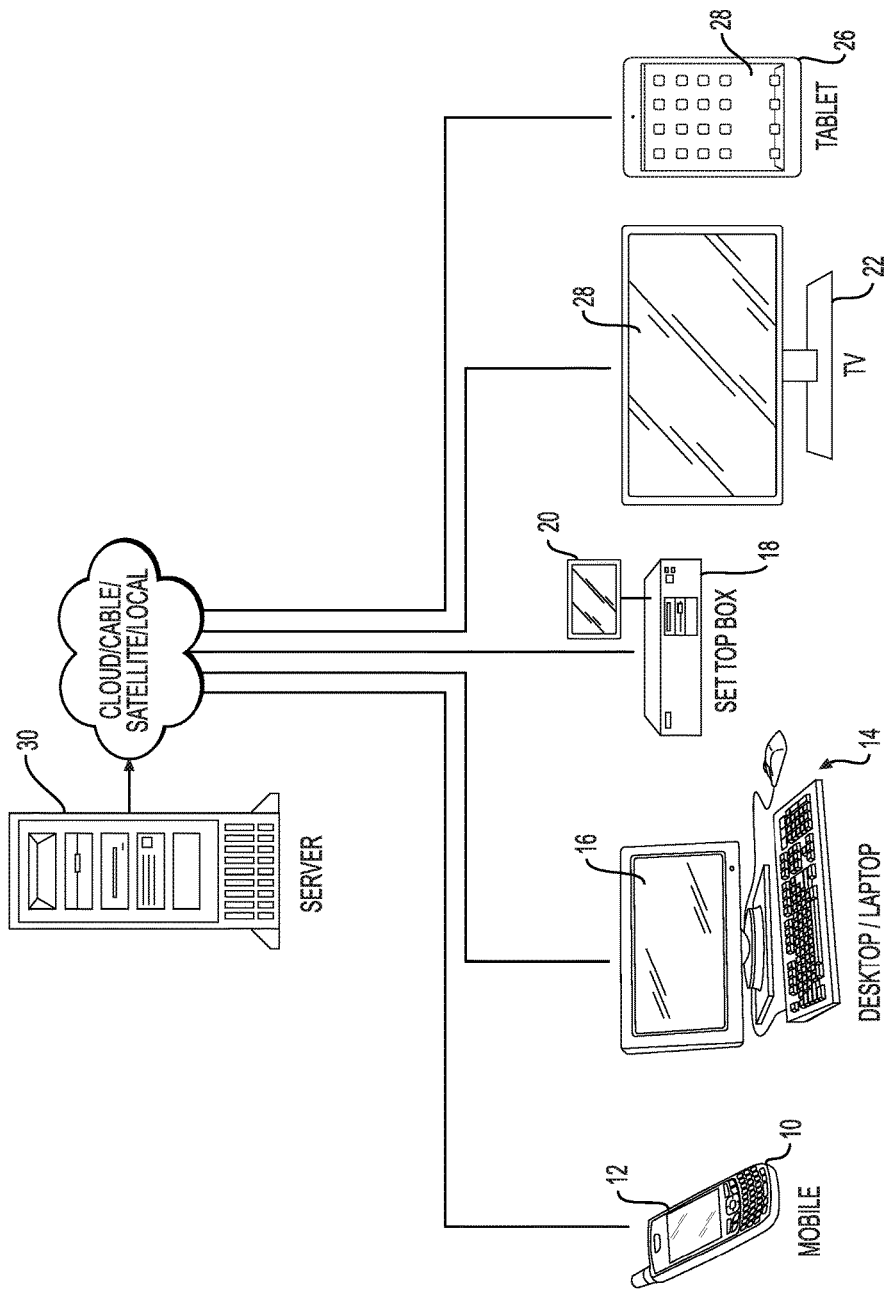
FIG. 1 illustrates a diagram of example devices that may be used to display television content, and upon which aspects of this disclosure may be implemented.

The following detailed descriptions are presented to enable any person skilled in the art to make and use the disclosed subject matter. For purposes of explanation, specific nomenclature is set forth to provide a thorough understanding. However, it will be apparent to one skilled in the art that these specific details are not required to practice the disclosed subject matter. Descriptions of specific applications are provided only as representative examples. Various modifications to the disclosed implementations will be readily apparent to one skilled in the art, and the general principles defined herein may be applied to other implementations and applications without departing from the scope of this disclosure. The sequences of operations described herein are merely examples, and the sequences of operations are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness. This disclosure is not intended to be limited to the implementations shown, but is to be accorded the widest possible scope consistent with the principles and features disclosed herein.

This disclosure describes, among other things, systems and methods, and user interfaces (UIs) for convenient playback of audio and/or visual media content, that in some examples includes television programming. The media content may be arranged or otherwise available in the form of channels, with each channel providing discrete blocks referred to herein as shows. Each show may have a predetermined start time or may be available on demand. The UI is presented on a display device such as, for example, a CRT, LCD, LED or other pixel based visible displays in response to signals received from a display signal output device. Portions of the UI may be presented at one or more edges of the display, or may be contained within a window area of the display. The UI may be presented as an overlay on top of a portion of active visual content as further described below and shown in the drawing figures.

FIG. 1 illustrates a high-level diagram of various examples of arrangements of devices that can cause a programming display. A mobile phone 10 has a display 12. A computer such a desktop or laptop 14 has a display 16. A set top box 18 such as are often associated with cable, satellite, or Wi-Fi programming delivery is connected to a display 20. A smart TV 22 has a display 24. A tablet type computer 26 has a display 28. A server 30 may be provided. The set top box 18 may include a digital video recorder (DVR) feature, which may involve local memory, memory on the server 30, or a combination. The set top box 18 may contain electronic program guide (EPG) information from a remote server such as server 30. The server 30 may provide some or all the programming content to any of the displays, or to any of the hardware in devices 10, 14, 18, 22, 26. The server may contain some or all of the software associated with implementing the UI described herein, and may interact in one-way or two-relation with the respective device. Alternatively the hardware in devices 10, 14, 18, 22, 26 may contain some or all of the software associated with implementing the UI described here. The server 30 may be connected to any of devices 10, 14, 18, 22, 26, via any known connection such as cable, satellite signal, Wi-Fi, any aspects of the Internet, cloud computing, etc.

Using any or all of the above devices, or other hardware, the UI may be implemented completely locally on a user device, or using information transfer totally managed by a web server, or may be cloud-based and operate via the Internet as a cloud-based operation. As further described below, the UI, may in some implementations, be operable to select a show for viewing as active content on a main currently ongoing active content area of the display. The UI is also operable to select a show for current recording (whether that show is concurrently (in an active show display area of the display or elsewhere) and/or to select a show for future recording. Thus, a show listed as having a start time in the future can be selected for recording using the UI at any time.

Figure 2:
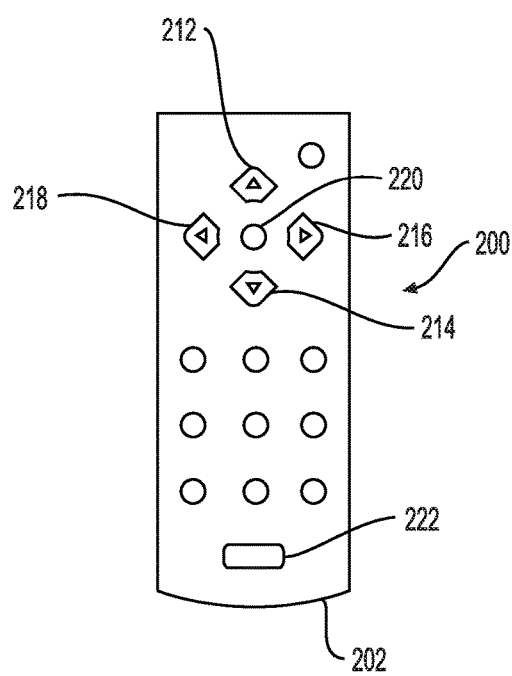
FIG. 2 illustrates an example of a user input device.

FIG. 2 illustrates a user input device that may be used to provide commands that cause changes in the content and arrangement of information conveyed via the UI. The user input device 200 may be in the form of a hand held remote control 202, or may be provided by buttons on any of devices 10, 14, 18, 22, 26, or by buttons on displays 12, 16, 20, 24, 28, for example if those displays have touch screen capability. Alternatively, the buttons may be accessed by moving a pointer on the screen with a mouse or via touch screen activity, haptic motion activity, gesture controls, or other input methods. In some implementations the UI is controlled using at least: an up button 212, a down button 214, a right button 216, a left button 218, and an enter button 220. A back button 222 may also be provided.

The touch screen capability described above may include a swiping capability that allows the user to interface with the programming channel guide list to expand and/or collapse a specific portion of the list. The specific portion may correspond to a specific channel that may be expanded using the swipe mechanism to show additional information available for that channel. The additional information may include future content available for viewing on the selected channel in addition to the current content available and being shown on the selected channel. Once expanded, the specific portion may subsequently be collapsed to limit the information displayed on the program guide to the information about current channel that is available for viewing.

Figure 3:
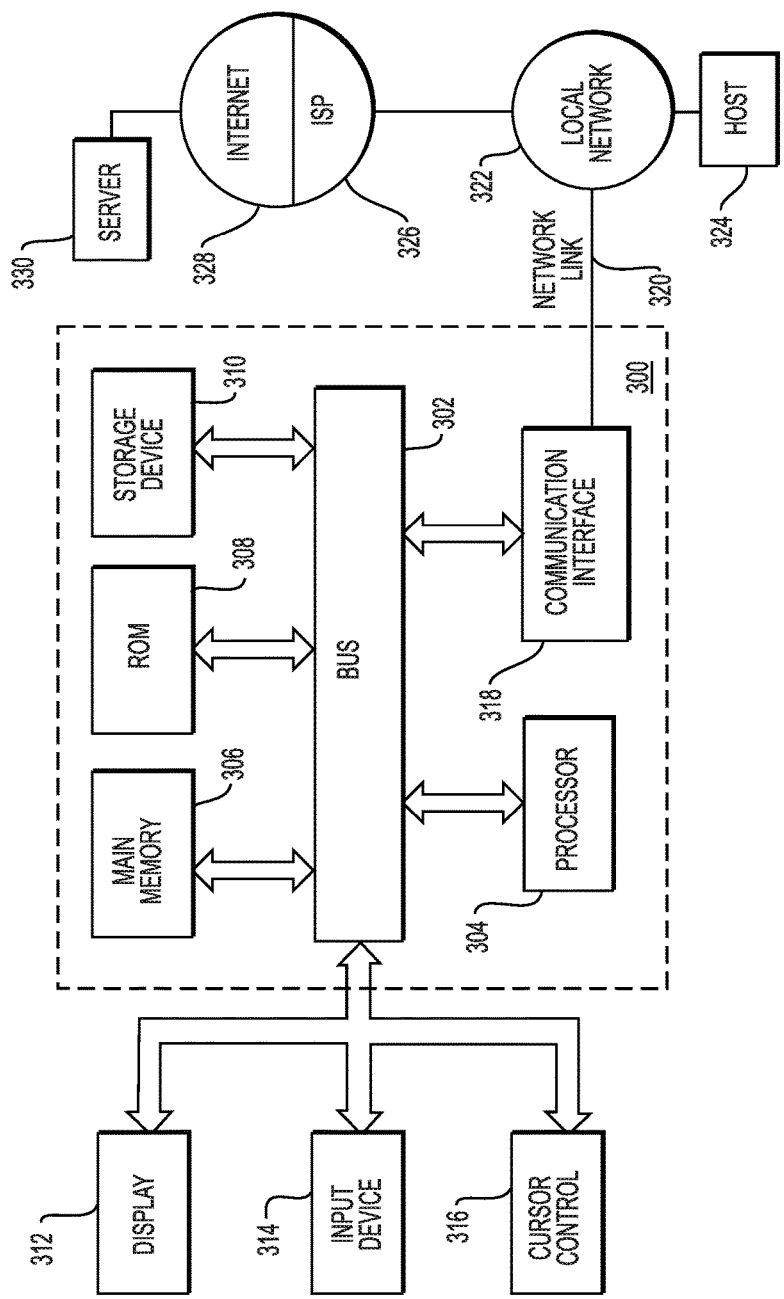
FIG. 3 is a block diagram that illustrates a computer system upon which aspects of this disclosure may be implemented.

FIG. 3 is a block diagram that illustrates a computer system 300 upon which aspects of this disclosure may be implemented, such as, but not limited to server 30 and/or any of devices 10, 14, 18, 22, 26. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT) or liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In one specific example, the input device 314 may have a limited number of key, and the display 312 may be a touchscreen display arrangement for receiving additional input via user touching the display 312. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display. To this end, although not shown, the computer system 300 may include a touch/position sensor. The sensor is relatively transparent, so that the user may view the information presented on the display 312. A sense circuit sensing signals from elements of the touch/position sensor and detects occurrence and position of each touch of the screen formed by the display 312 and the sensor. The sense circuit provide touch position information to the processor 304, which can correlate that information to the information currently displayed via the display 312, to determine the nature of user input via the screen. The display 312 and touch sensor (and possibly one or more keys 314, if included) are the physical elements providing the textual and graphical user interface for the computer system 300. Other input devices are contemplated such as, for example, a remote control device as shown in FIG. 2.

This disclosure is related to the use of computer systems such as computer system 300 for implementing the techniques described herein. In some examples, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

FIGS. 4-9 and 11 illustrate the UI 400 as it is navigated between different display states or display conditions, inside a display window 402. The display window may occupy some or all of the actual physical display screen. Inside the display window 402 an active content 404 is presented in a media field area. The active content 404 may be a show that is playing on a channel, for example the active content 404 may be a live television show, via RF transmission, cable transmission, satellite transmission, Internet communication, or any combination, and may be, for example, a show that is playing live, on demand, a pre-recorded show from a DVR feature, a show available via a computer, a computer network, stored remotely or locally, etc.

In some implementations, the active content 404 remains playing during user command interaction with the UI 400, and the UI 400 is an overlay on top of the active content 404. In the examples illustrated in FIGS. 4-9 and 11, the media field area occupies substantially all of a width and height of the display window 402. The UI 400 may be opaque to the active content 404, or may be partially transparent relative to the active content 404.

Figure 4:
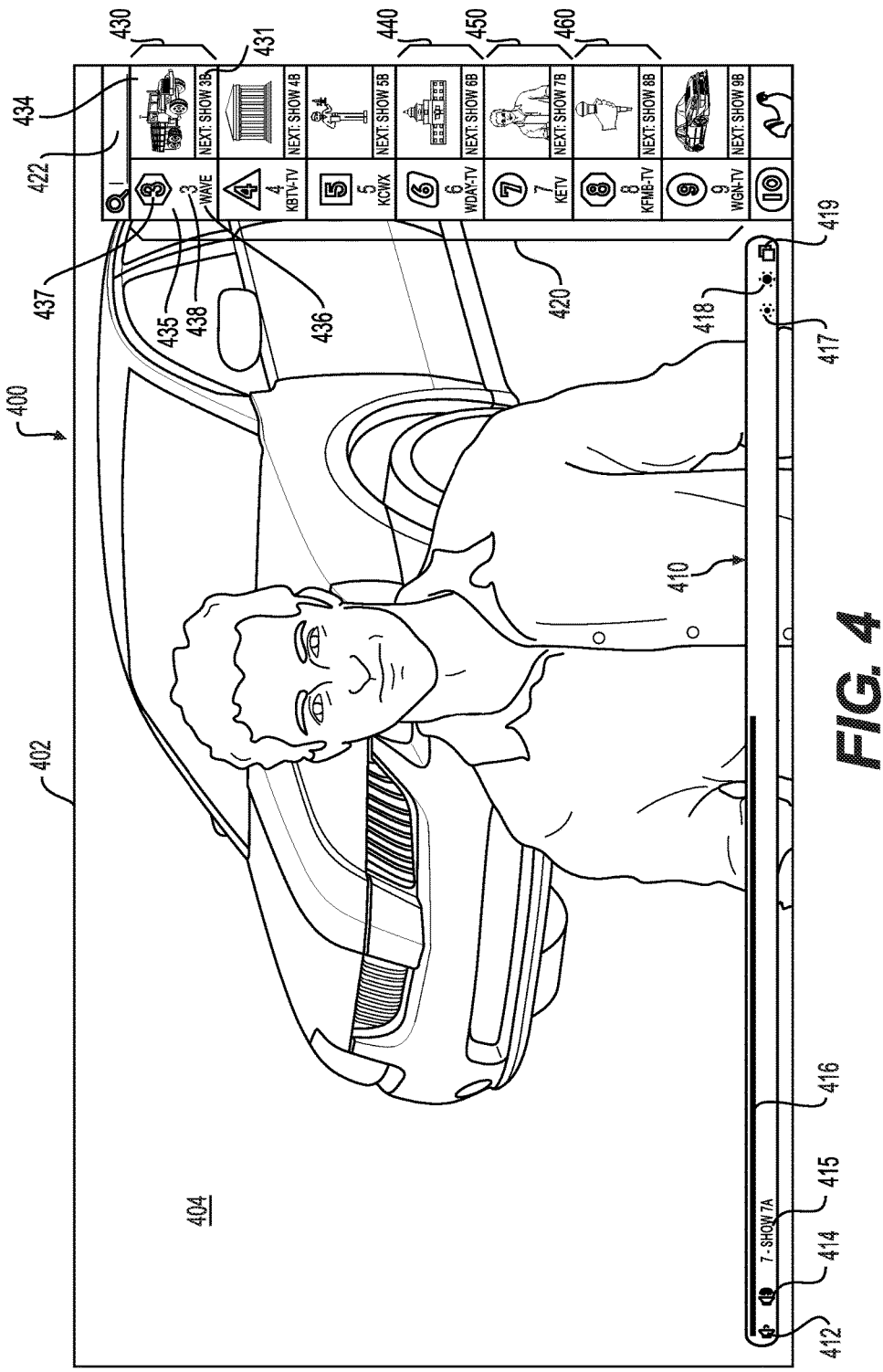
FIG. 4 illustrates an output on a video screen display, having aspects of a user interface for channel and show selection.

FIG. 4 illustrates an example appearance state of the UI 400. In the state of FIG. 4, the UI 400 has received a first activation command input by a user via the enter button 220, or any other button or feature of the user input device. In this state, the UI 400 includes a display information bar 410, near the bottom edge of the window 402. The display information bar 410 may include audio volume up down control icons 412 and 414 and a progress bar 416 showing progress of the active content 404. The display information bar 410 may include a content title display 415, which identifies an active content being displayed in the media field area. The display information bar 410 may include other control icons. Display information bar 410 may include a brightness decrease button 417 may be provided that causes a brightness of display window 402 or a display device on which display window 402 is displayed to be decreased, and a brightness increase button 418 may be provided that causes a brightness of display window 402 or a display device on which display window 402 is displayed to be increased. Display information bar 410 may include a full screen button 419 that allows toggling between display window 402 occupying only a subportion of a physical display screen and display window 402 occupying the entire physical display screen. Thus, the display information bar 410 my allow input of commands to the display and/or to the UI 400, and therefore any or all of the buttons shown in FIG. 2 may additionally or alternatively be provided anywhere on the UI 400, including for example as part of the display information bar 410.

In the state illustrated in FIG. 4, the UI 400 also includes a channel bar 420 (which may be referred to as a "program guide"), displayed in a second field area. In the example illustrated in FIG. 4, the second field area is in the form of a bar region along a right edge area of the display window 402. The channel bar 420 may include a search window 422. In the state illustrated in FIG. 4, the channel bar 420 displays a plurality of tiles (which may also be referred to as "boxes" or "cells") each associated with a programming channel, such as tiles 430 (associated with channel number 3), 440

(associated with channel number 6), 450 (associated with channel number 7), and 460 (associated with channel number 8). The information displayed in a tile may in some implementations be obtained from an EPG. Referring to tile 430, tile 430 may include a channel identification region 435, or adjacent to tile 430 may be displayed a respective channel identification region 435, displaying channel information such as, but not limited to, a channel number 438, a channel logo 437, and/or a channel name 436. In some examples, a tile may display information about a show currently available for playback via its respective channel (which may be referred to as a "current content" for its respective channel); for example, the tile 430 includes a showcard 434 that displays information about a show currently available for playback via channel number 3 (tile 450 includes a similar showcard for the active content 404). In some examples, a tile may display information about a show that is next to be available via that channel; for example, tile 430 displays a show title 431 for a next available show on channel number 3, having a title "SHOW 3B", by displaying the text "NEXT: SHOW 3B." In some examples, a tile may display information about a show currently playing on that channel. In some examples, a status bar showing a progress of a show (for example, a bar similar to progress bar 416) currently available on a channel associated with a tile may also be included in the tile. Additional information may be presented in the tile as described in other implementations below. Other tiles displayed in channel bar 420 may be presented in the format of tile 430. The plurality of tiles displayed in channel bar 420, with or without respective channel identification regions, may be referred to as a "listing of programming channels," and the channels displayed in channel bar 420 may be a subset of a larger set of available programming channels.

Figure 5:
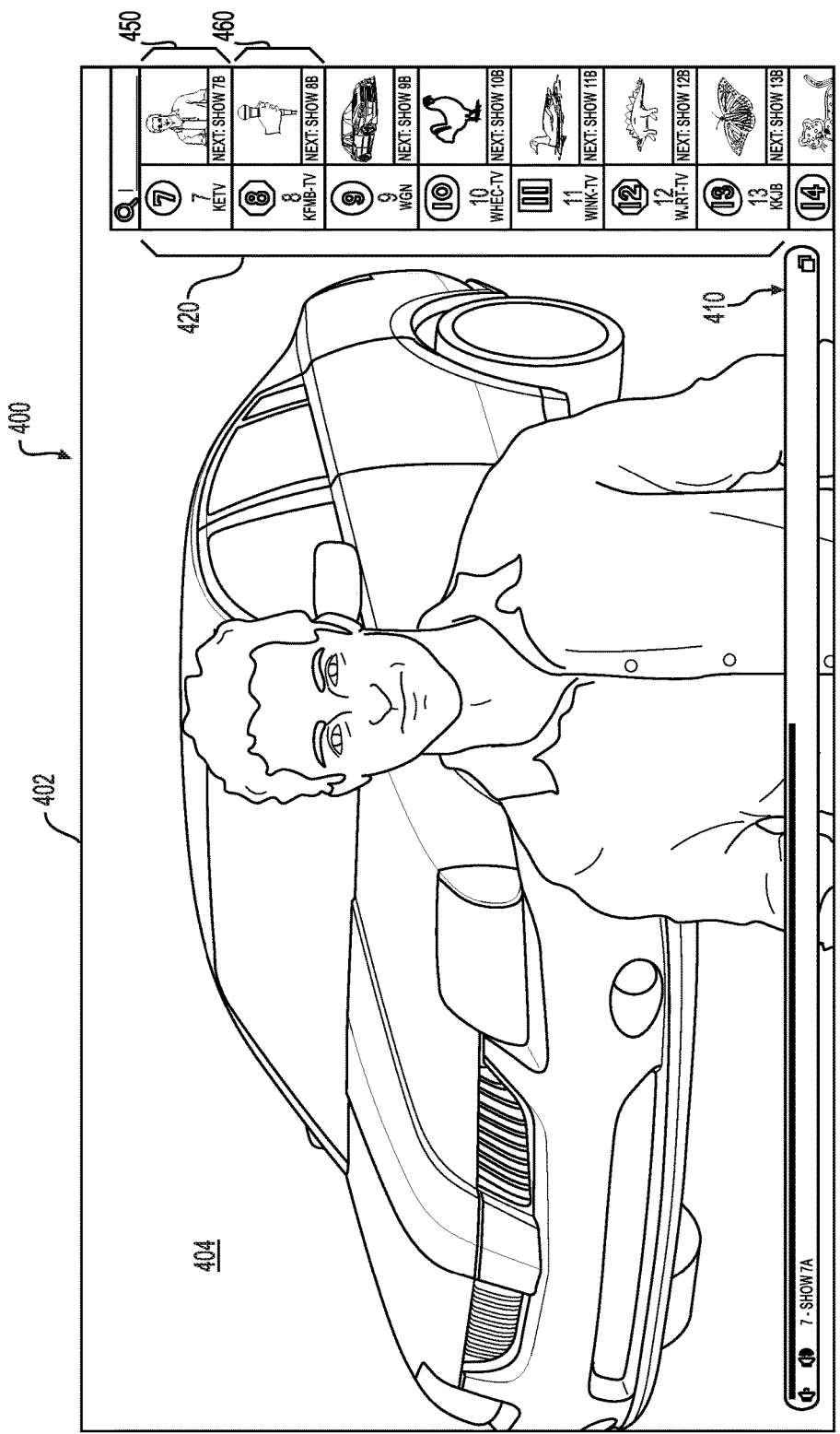
FIG. 5 illustrates an example in which the channel bar displays a different range of channels than displayed in FIG. 4.

FIG. 5 illustrates an example in which the channel bar 420 displays a different range of channels than displayed in FIG. 4. For example, the range of channels displayed in channel bar 420 may be responsive to a navigation command received via a user input device such as, for example, via the up and down buttons 212 and 214 included in the user input device 200 illustrated in FIG. 2.

Figure 6:
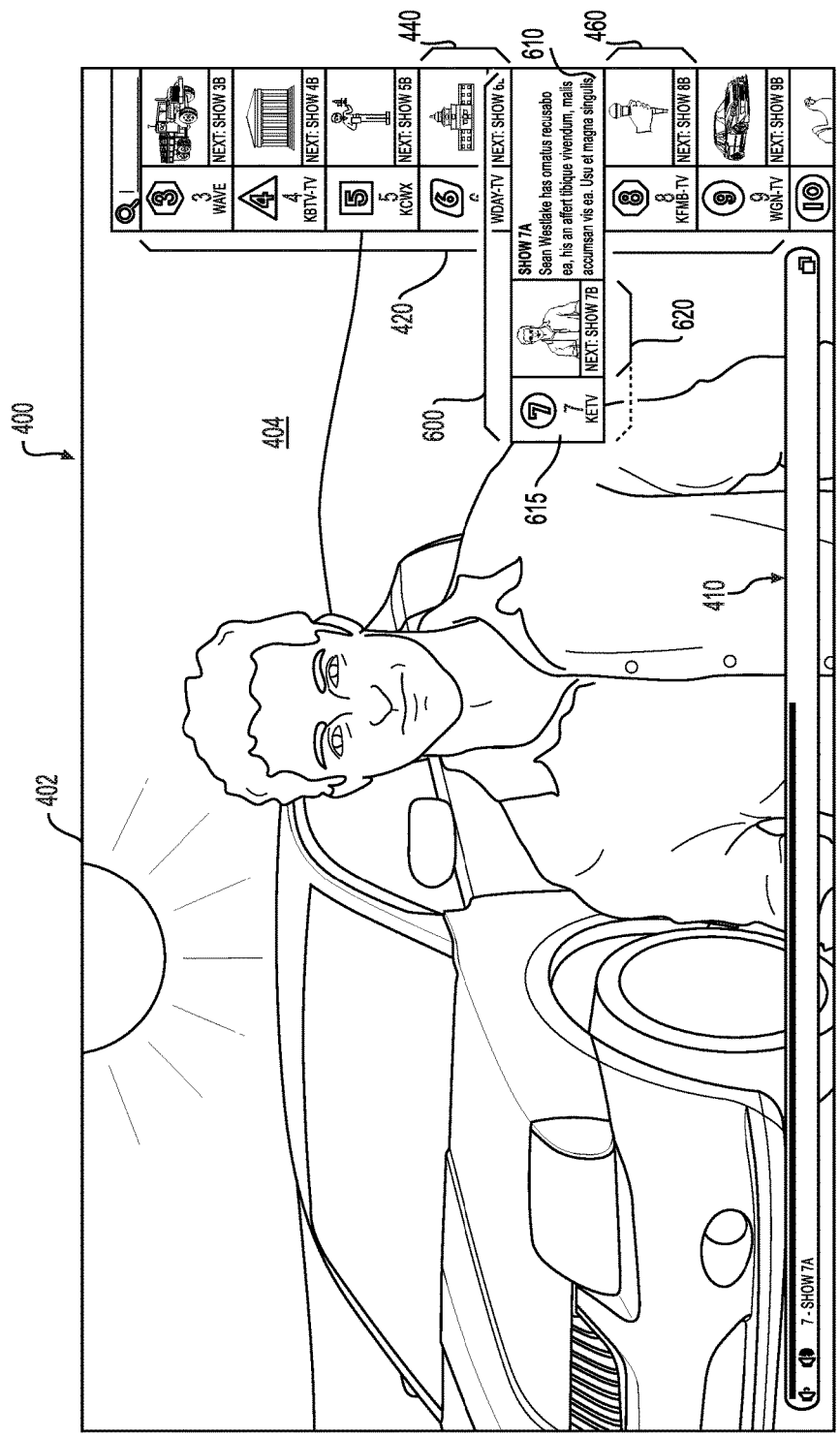
FIG. 6 shows another implementation, or state, of the UI, in which the channel bar displays additional information for a currently selected channel in channel bar.

FIG. 6 shows another implementation, or state, of the UI 400, in which the channel bar 420 displays additional information for a currently selected channel in channel bar 420. For example, UI 400 may transition from the state illustrated in FIG. 4 to the state illustrated in FIG. 6 in response to a navigation command received via a user input device such as, for example, the user input device 200 illustrated in FIG. 2. In some implementations, the first activation command input discussed in association with FIG. 4 may result in UI 400 being initially presented in the state illustrated in FIG. 6, in which the selected channel may be by default the channel corresponding to the active content 404 currently being displayed in the media field area. Alternatively, the selected channel may be a channel selected by navigation commands, such as via the up and down buttons 212 and 214, or any other up-down, or back-next, type input from a user.

In the specific example illustrated in FIG. 6, the channel with channel number 7 (corresponding to tile 450 illustrated in FIGS. 4 and 5) is the currently selected channel. For the currently selected channel, an expanded display field area 600 (which may be referred to as an "expanded display area," an "expanded listing area," a "slice," a "slice area," or a "slice field area") is displayed at a position corresponding to where a tile for the currently selected channel had been or would be displayed in channel bar 420 (in the illustrated example, between tile 440 for channel number 6 and tile 460 for channel number 8, where tile 450 had been displayed in the state illustrated in FIG. 4, or is displayed in FIGS. 7-9 and 11). The slice area 600 for the currently selected channel may be displayed in response to a first navigation command, such as, for example, by the user operating the right and left buttons 216, 218. By operating the left and right buttons 216, 218, or via other input devices, the user can generate navigation commands for UI 400 which allow navigation via the slice function.

As illustrated in FIG. 6, the slice area 600 may include a first tile 620 (which may also be referred to as a "segment region") for the selected channel that may display substantially the same information as displayed by the tile 450 for the same channel in FIGS. 4 and 5. As indicated by the dashed line in FIG. 6, the first tile 620 may include or be displayed adjacent to a channel identification region 615 similar to the channel identification region 435. As illustrated in FIG. 6, the slice area 600 may also include a detailed description area 610, which displays a detailed description of a show currently selected in slice area 600. In the example illustrated in FIG. 6, tile 620 corresponds to a show titled "SHOW 7A", which is currently available for playback (and is currently playing as active content 404) on the selected channel, and is the show currently selected in slice area 600. Detailed description area 610 displays the title of the selected show (corresponding to tile 620 adjacent to detailed description area 610) and a brief text description of the show. As illustrated by the example in FIG. 6, when slice area 600 is initially displayed, slice area 600 may only display a single showcard for a show currently available for playback via the selected channel.

Figure 7:
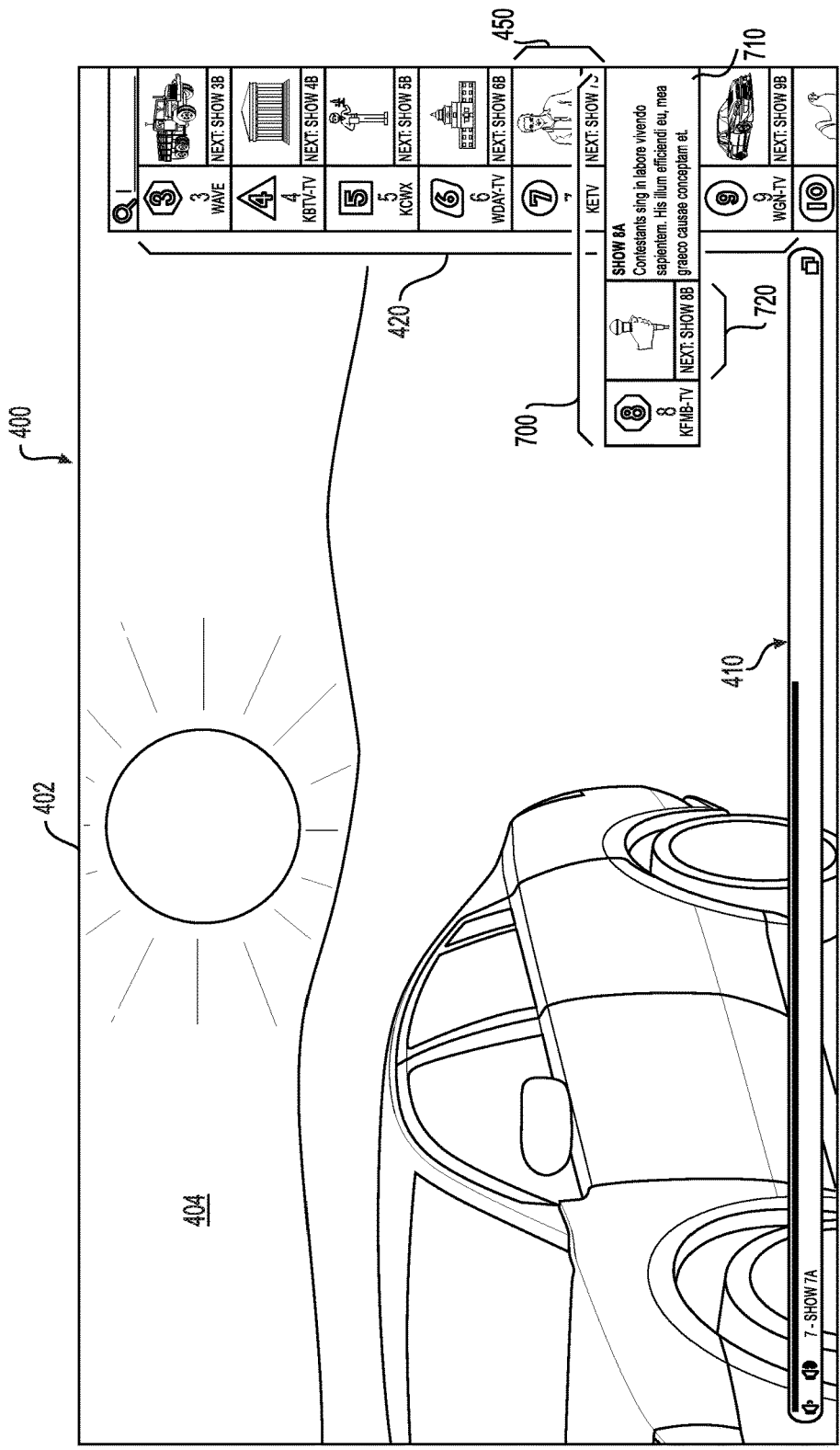
FIG. 7 illustrates another example state of the UI, with a different channel being selected in the channel bar and a corresponding slice area.

FIG. 7 illustrates another example state of the UI 400, with a different channel being selected in the channel bar 420 and a corresponding slice area 700. For example, starting in the state illustrated in FIG. 6, in response to a navigation command (such as a navigation command resulting from a user pressing the down button 214 on the user input device 200 illustrated in FIG. 2) the currently selected channel for channel bar 420 may change to the channel associated with tile 460 (channel number 8). As a result, for channel number 7, slice area 600 may no longer be displayed, and instead tile 450 is displayed in channel bar 420. Also as a result, instead of displaying tile 460 in channel bar 420, a slice area 700 may be displayed for the newly selected channel. Slice area 700, and tile 720 and detailed description area 710 therein, are much the same as discussed above for slice area 600.

Figure 8:
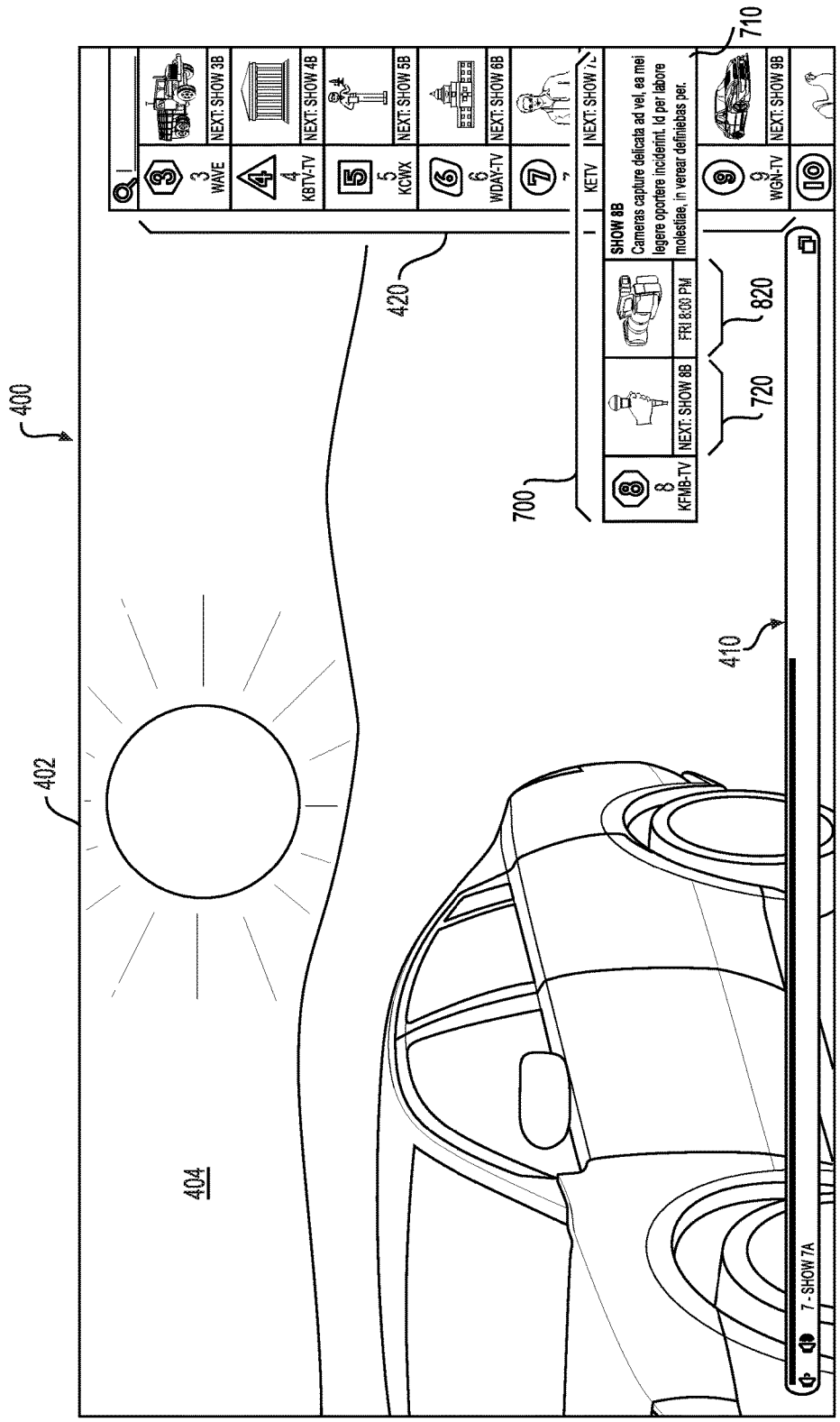
FIG. 8 illustrates another example state of the UI, in which the slice area for the channel selected in the channel bar has expanded to display an additional tile for another show available via the selected channel.

FIG. 8 illustrates another example state of the UI 400, in which the slice area 700 for the channel selected in the channel bar 420 has expanded to display an additional tile 820 for another show available via the selected channel. The additional tile 820 is displayed in FIG. 8 between tile 720 and detailed description area 710, and tile 720 may be shifted to accommodate tile 820. The additional tile 820 may be displayed in response to a second navigation command, such as for example, resulting from a user operating the right and left buttons 216, 218. By operating the left and right buttons 216, 218, or via other input devices, the user can navigate the slice function. For example, starting in the state illustrated in FIG. 7, a press of left button 218 may provide a navigation command resulting in a transition to the state illustrated in FIG. 8; additionally, this may result in the show selected in slice area 700 changing from the show corresponding to the showcard displayed in tile 720 to the show corresponding to tile 820. As another example, starting in the state illustrated in FIG. 9, four presses of right button 216 may provide navigation commands resulting in the state illustrated in FIG. 8; additionally, this may result in the show selected in slice area 700 changing from the show corresponding to the showcard displayed in tile 950 to the show corresponding to tile 820.

The tile 820 may indicate a future show that is not currently available for playback via the selected channel, but will be available for playback at a future time. The tile 820 may include information about a future show, including a start time for the future show indicating when it will be available for playback (or, in some examples, for recording); in the example illustrated in FIG. 8, a future show corresponding to tile 820 has a start time of "FRI 8:00 PM." As illustrated in FIG. 8, the detailed description area 710 of the show may display a detailed description of the show corresponding to tile 820 (in FIG. 8, that show is titled "SHOW 8B").

Navigation commands, such as by operating the left and right buttons 216, 218 on the user input device 200 illustrated in FIG. 2 or via other input devices, the slice function may be navigated, changing the currently selected show in slice area 700. In some implementations, such navigation may result in tiles, such as tiles 720 and 820, being added or removed from slice area 700; for example, the tile immediately adjacent to detailed display area 710 may always correspond to the currently selected show. In some implementations, the selected show may be highlighted. For example, the user may select, or highlight, either the show corresponding to tile 720 (titled "SHOW 8A") or the show corresponding to tile 820 (titled "SHOW 8B"). In response to a navigation command selecting a show, detailed display area 710 may display information about the selected show. In the example illustrated in FIG. 8, a user may navigate left and right to select a show for further display. When a show had been selected or highlighted, then further commands may be received, such as via user input device 200, and implemented. For example, by pressing the enter button 220, the user may provide a command to view the selected show as the active content 404. Also for example, by pressing the enter button 220, the user may provide a command to record that show for storage and/or future viewing (for example, in response to the selected show not currently being available for playback).

Figure 9:
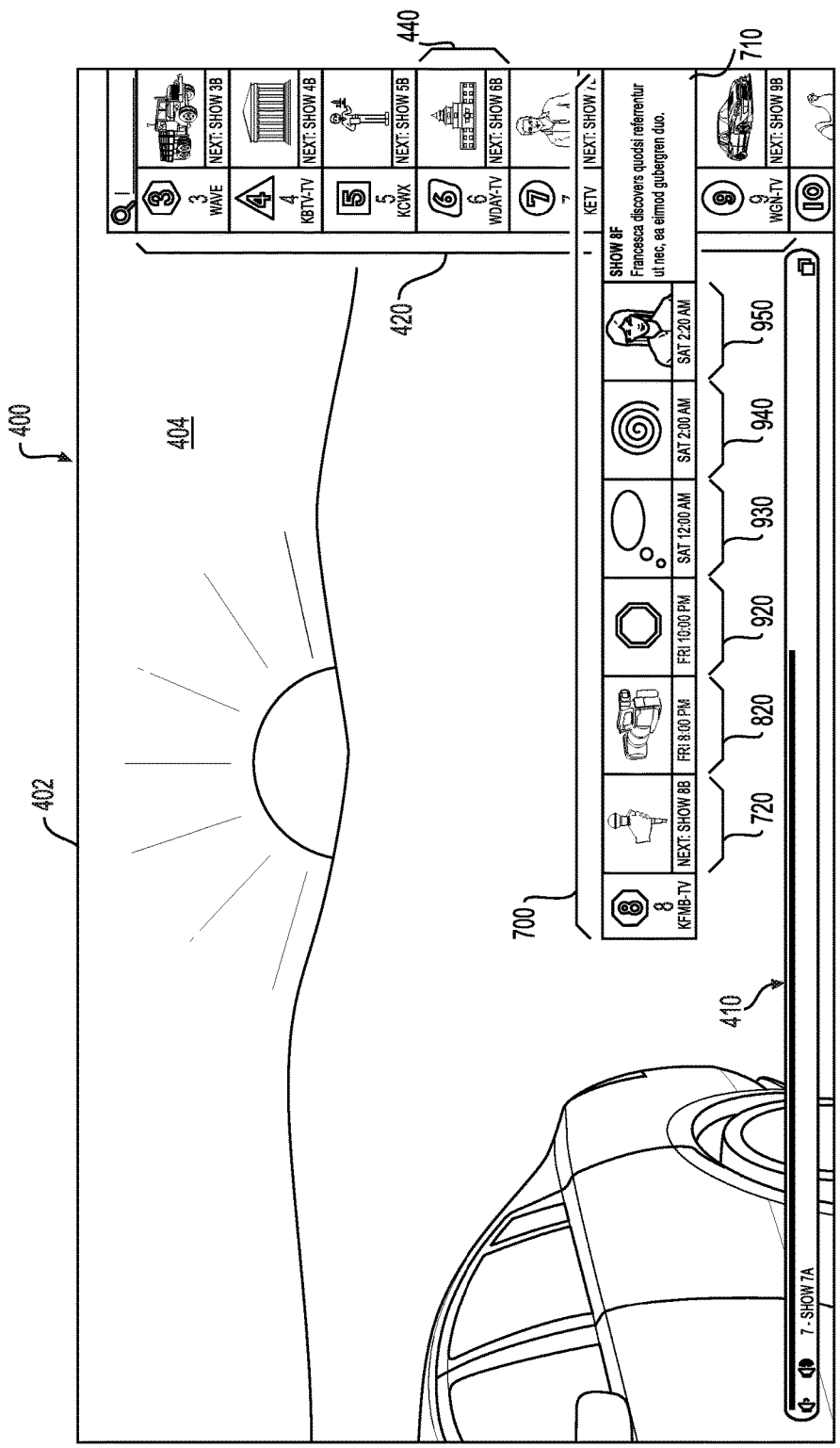
FIG. 9 illustrates another example state of the UI, in which the slice area for the channel selected in the channel bar has further expanded to display additional tiles for other shows available via the selected channel.

FIG. 9 illustrates another example state of the UI 400, in which the slice area 700 for the channel selected in the channel bar 420 has further expanded to display additional tiles 920, 930, 940, and 950 for other shows available via the selected channel. The additional tiles 920, 930, 940, and 950 are displayed in FIG. 9, between tile 820 and detailed description area 710, and tiles 720 and 820 may be shifted to accommodate tiles 920, 930, 940, and 950. The additional tiles 920, 930, 940, and 950 may be displayed in response to navigation commands, such as for example, resulting from a user operating the right and left buttons 216, 218. By operating the left and right buttons 216, 218, or via other input devices, the user can navigate the slice function. For example, starting in the state illustrated in FIG. 8, a first press of left button 218 may provide a navigation command resulting in tile 920 being displayed in slice area 700, a second press of left button 218 may result in tile 930 being displayed, a third press of left button 218 may result in tile 930 being displayed, and a fourth press of left button 218 may result in tile 950 being displayed. As each additional tile is displayed, the show selected in slice area 700 may change to the show corresponding to the newly displayed tile, and detailed description area 710 may be changed to display details about the newly selected show.

The slice area 700 may be expanded to display the additional tiles 920, 930, 940, and 950 in response to a second or third navigation command, such as for example, by the user operating the right and left buttons 216, 218. By operating the left and right buttons 216, 218, or via other input devices, the user can navigate the slice function. The tiles 920, 930, 940, and 950 may each correspond to a future show for the selected channel. The tiles 920, 930, 940, and 950 may each include information about a respective future show, including a start time of the future show. As illustrated in FIG. 9, multiple tiles displayed in a slice area may be arranged according to the start time for their respective shows; in FIG. 9, tiles 720, 820, 920, 930, 940, or 950 are arranged from left to right in increasing order of start time. For example the user may select, or highlight, any of the shows corresponding to tiles 720, 820, 920, 930, 940, or 950. Upon this selection command, detailed description area 710 may display information about the selected show. The user may navigate left and right in this example to select a show for further display. When a show had been selected or highlighted, then further commands may be received, such as via user input device 200, and implemented. For example, by pressing the enter button 220, the user may provide a command to view the selected show as the active content 404. Also for example, by pressing the enter button 220, the user may provide a command to record that show for storage and/or future viewing (for example, in response to the selected show not currently being available for playback).

FIG. 9 illustrates another feature of some implementations of UI 400. In some implementations, the slice area 700 may be navigated horizontally to select or highlight a desired tile (in FIG. 9, tile 950 is the "selected tile" corresponding to the show that is currently selected in slice area 700) and change the selected tile. Each of the tiles 820, 920, 930, 940, and 950 may be displayed as having the same size as each other. The size of any given tile 820, 920, 930, 940, or 950 may be independent of a start and end time (or total time length) of the show corresponding to the respective tile. In this way, a user can horizontally scan across the slice 700, and see tiles related to multiple shows, regardless of the length of time of the show. This feature is illustrated by the example shown in FIG. 9, in which tile 930 (for a show having a start time of "SAT 12:00 AM" and a duration of 120 minutes) is displayed with the same width as tile 940 (for a show having a start time of "SAT 2:00 AM" and a shorter duration of 20 minutes).

The exemplary provided show "titles or times" such as "SHOW 4B" and "FRI 8:00 PM" etc. are by way of example only. Any tiles or cells may provide the actual show name, any indicator of a show name, and/or start time. References to segments comprises references to cells as described and illustrated herein.

Figure 10:
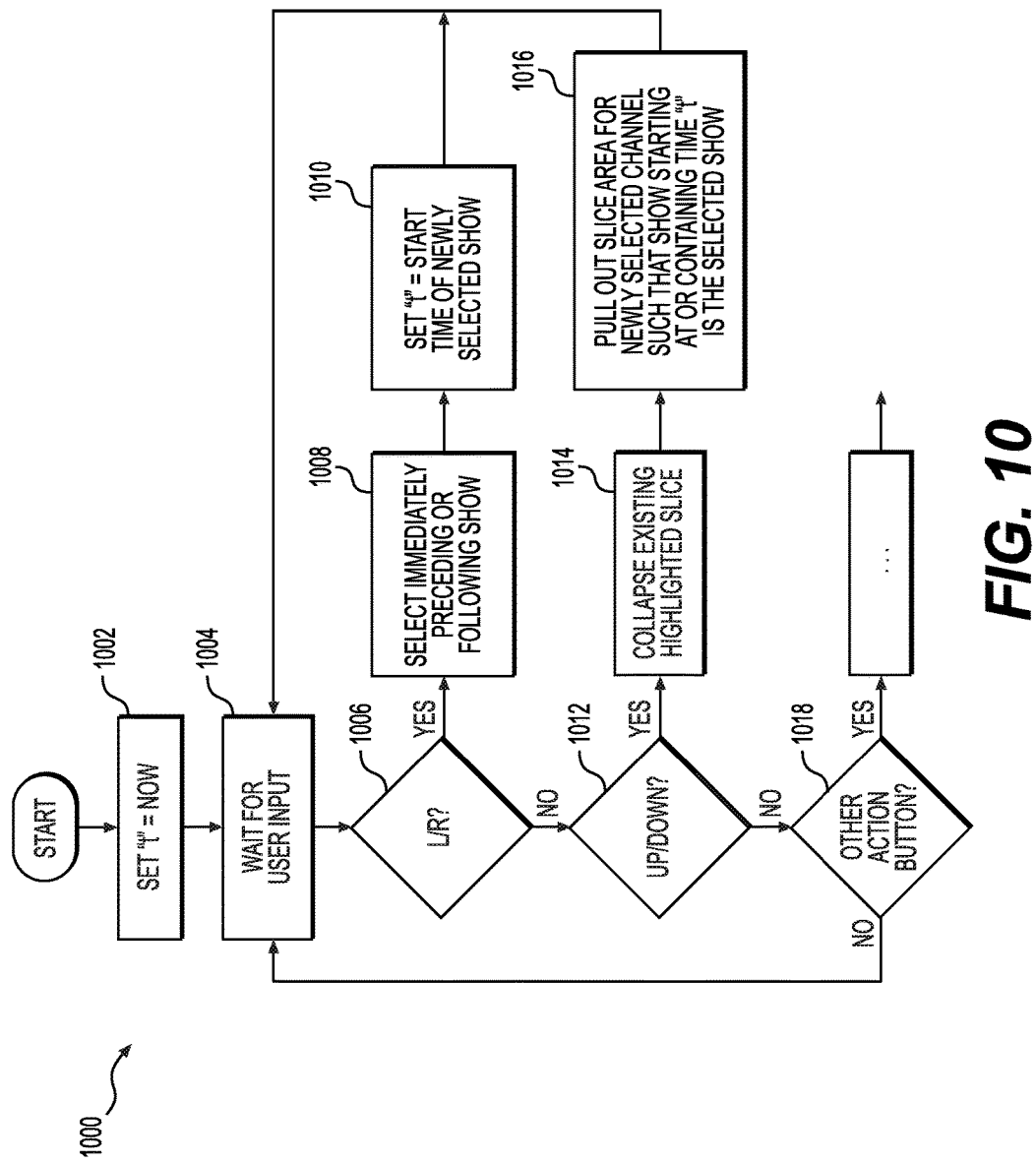
FIG. 10 illustrates an example of a process relating to displaying slice areas in response to changes in the selected channel for channel bar, such as in response to navigation commands resulting from a user scrolling up or down through available channels.

FIG. 10 illustrates an example of a process 1000 relating to displaying slice areas in response to changes in the selected channel for the channel bar 420, such as in response to navigation commands resulting from a user scrolling up or down through available channels using an input device such as, for example, by pressing the up and down buttons 212 and 214. The process 1000 begins with a step of setting a time "t" to "now" (Step 1002) and waiting for a user input (Step 1004). Upon receiving the user input, it may be determined if the input corresponds to one of left or right input movement (Step 1006). If yes (Step 1006, Yes), the selected show (which may be indicated by highlighting a respective tile) may be shifted to a show on the selected channel immediately preceding the currently selected show (if such a show is available) or a show on the selected channel immediately following the currently selected show (Step 1008). For example, in the show corresponding to tile 940 were the currently selected show, the show corresponding to tile 930 (having a start time two hours earlier) may be selected in response to a right input movement or the show corresponding to tile 950 (having a start time twenty minutes later) may be selected in response to a left input movement. The time "t" may then be set to the start time of the newly selected show on the selected channel (1010). The process 1000 then goes back to waiting for additional input from the user (Step 1004).

If it is determined that the received input does not correspond to one of left or right input movement (Step 1006, No), it is determined whether the received input corresponds to up or down input movement (Step 1012). If yes (Step 1012, Yes), the currently selected slice on the program guide is collapsed (Step 1014) and a slice for the newly selected channel is pulled out such that a show available for playback via the newly selected channel is displayed in the slice and becomes the currently selected show based on a period of time that the show is available for playback starting at time "t" (in other words, having a start time equal to time "t") or containing time "t" (Step 1016). The process 1000 then goes back to waiting for additional input from the user (Step 1004).

If it is determined that the received input does not correspond to the up or down movement (Step 1012, No), then it is determined whether the received input corresponds to any other type of recognized action item (Step 1018). If yes (Step 1018, Yes), the process 1000 proceeds to perform that action item (Step 1020) before returning to Step 1004 to wait for additional user input. If however, the received input does not correspond to any other recognized type of action item (Step 1018, No), the process 1000 proceeds to Step 1004 to wait for additional user input.

Figure 11:
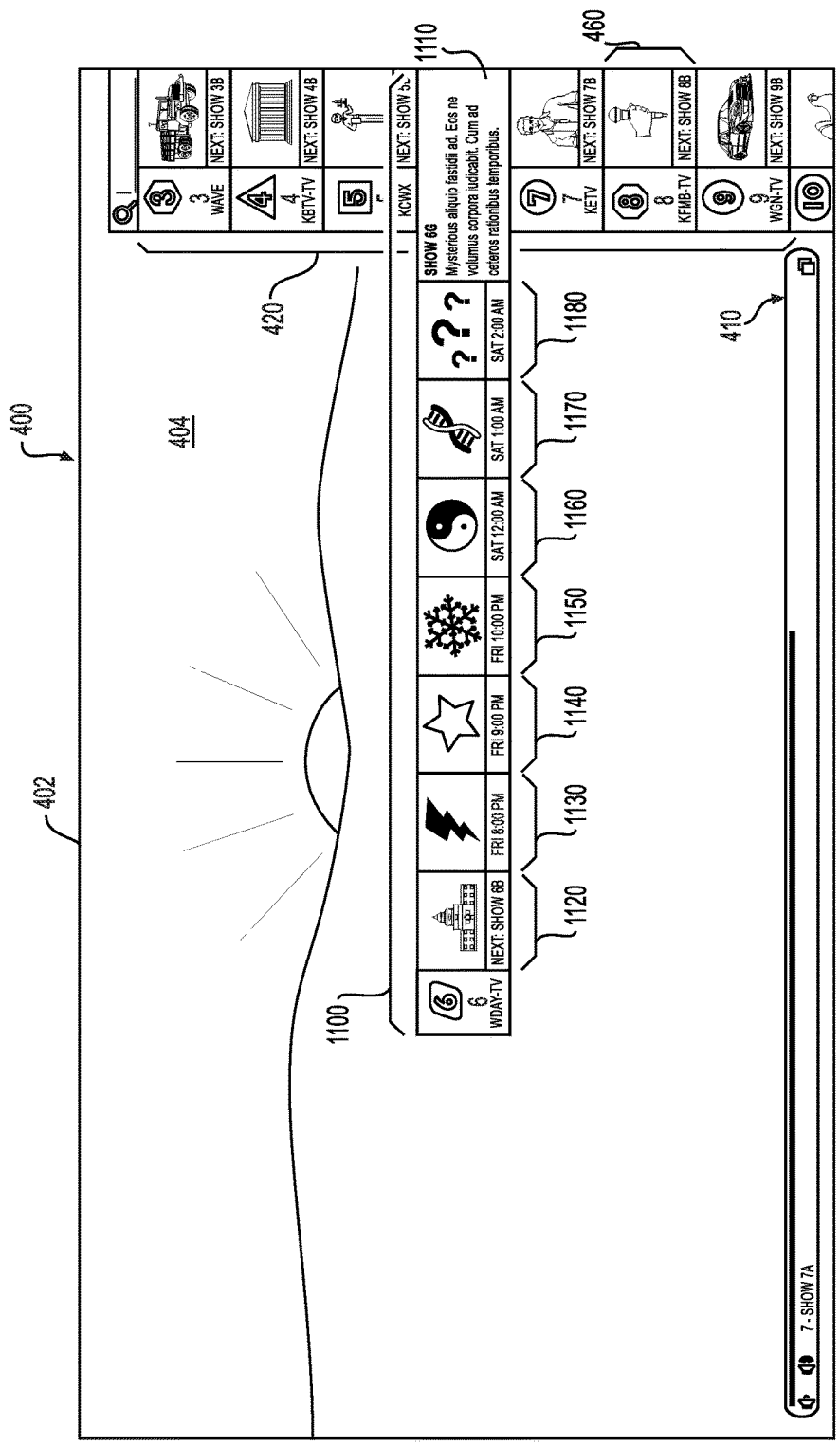
FIG. 11 illustrates an example in which the process 1000 illustrated in FIG. 10 has been applied to user changing the selected channel from the state illustrated in FIG. 9.

FIG. 11 illustrates an example in which the process 1000 illustrated in FIG. 10 has been applied to user changing the selected channel from the state illustrated in FIG. 9. Specifically, in FIG. 11, the selected channel has changed from channel number 8 (the selected channel in FIG. 9) to channel number 6 (corresponding to tile 440 in FIG. 9). In the state illustrated in FIG. 9, tile 950 corresponds to the show selected in slice area 700, which has a start time of Saturday at 2:20 AM. Therefore, according to the process 1000, the time "t" may have been set to Saturday at 2:20 AM (for example, as a result of step 1010). From that state in FIG. 9, the user may then press the up button 212 twice to change the selected channel from channel number 8 (corresponding to tile 460 shown in FIG. 11) to channel number 6 (corresponding to tile number 440 shown in FIG. 9, and slice area 1100 in FIG. 11) while playback of active content 404 (from channel number 7) continues in the media field area of the display. In this scenario, the slice area 700 for channel number 8 slice may collapse or otherwise be replaced by tile 460, and a new slice 1100 for channel number 6 slice may expand or pull out or otherwise replace tile 440 such that the show available via channel number 6 starting at or containing Saturday at 2:20 AM is the selected channel in slice 1100. In the particular example illustrated in FIG. 11, channel number 6 has a 1 hour show starting at Saturday at 2:00 AM (corresponding to tile 1180), so tile 1180 is displayed as the selected tile (and the time "t" still equals Saturday at 2:20 AM, in the event the user next navigates up or down and a new channel is selected).

In a slightly different scenario, not illustrated in FIG. 11, a user presses down to change the selected channel to channel number 9 from channel number 8. Slice area 700 for channel number 8 then collapses and a slice area for channel number 9 expands out such that a show starting at Saturday at 2:20 AM is highlighted instead of show starting at Saturday at 2:00 AM (as shown in FIG. 11). This is because in this scenario channel number 9 has a 20 minute show at 2:00 AM and another 40 minute show at 2:20 AM so the 2:20 AM show is highlighted (the time "t" still equals 2:20 AM). The 2:00 AM show is not relevant. If the user presses right to advance the show selected in the slice area to the next future show starting at 3:00 AM, the time "t" is updated to Saturday at 3:00 AM.

To this end, the slice display programming of the instant application may remember the last time that was actively selected with left or right movement actions, and carries across the corresponding time as the user moves up and down through slices for the channels. For another example, assume the current time is 2:10 PM. On Channel 43 may be short 30 minute programs, with show 1 at 2:00 PM, show 2 at 2:30 PM, show 3 at 3:00 PM, show 4 at 3:30 PM, show 5 at 4:00 PM, show 6 at 4:30 PM, show 7 at 5:00 PM, show 8 at 5:30 PM, show 9 at 6:00 PM, and show 10 at 6:30 PM. On Channel 44 may be movies, with a new movie starting each 2 hours, with show A at 2:00 PM, show B at 4:00 PM, show C at 6:00 PM. On Channel 45 may be shorter 1 hour programs, with show M at 2:00 PM, show N at 3:00 PM, show 0 at 4:00 PM, show P at 5:00 PM, and show Q at 6:00 PM. Now, imagine the user pulls out the slice for Channel 45 to the show at 5:00 PM (show P). The time "t" may then be set to 5:00 PM. Then, the user navigates up to Channel 44. At the point it should switch to the slice for Channel 44 pulled out to show B (which runs from 4-6, which covers the 5:00 time for the item displayed for Channel 45). If the user navigates up again, the slice for Channel 43 is shown out to show 7 (5:00-5:30), which matches the selection made for Channel 45.

Many variations may be implemented. The channel bar is illustrated in examples as being vertical and at a right edge of the display window, but it may be at the left edge, or top or bottom edge. The program listing slices (i.e. the expanded listing areas) illustrated in examples as being horizontal and showing earlier in time programs towards the left side of the slice. However the timeline aspect of the program listing slices may be in an alternative order. Further depending on the arrangement and orientation of the channel bar, the program listing slices may be in an alternative orientation such as vertical, and projecting out of the bar downward, upward, and from left or right. The user input device may be located on the display screen, and/or as buttons on one or more devices. Many variations of audio and/or video content may be viewed and selected via the UI 400. For example, the shows may be in the form of advertisements displayed on a billboard. The active program content being displayed may include, by way of example only, any of locally stored media content, remotely stored media content, streaming media content, and/or live media content.

In view of the wide variety of permutations to the implementations described herein, this detailed description is intended to be illustrative only, and should not be taken as limiting the scope of the invention. To illustrate, while the description describes transport stream based digital television broadcasts being received by tuner based devices, implementations are not so limited. For example, cable television, satellite television, other sources of broadcast or multicast video, audio, or non-audio/video content, non-transport-stream based content, etc. Therefore, the specification and drawings are to be regarded in an illustrative rather than a restrictive sense.

The separation of various system components in the examples described above should not be understood as requiring such separation in all examples, and it should be understood that the described components and systems can generally be integrated together in a single packaged into multiple systems and/or multiple components.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 105 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A method for a user to view content information on a display, comprising:
    displaying in a display window on a display device a first field area configured to display active content associated with a first selected programming channel;
    receiving, from a user input device, a first activation command;
    in response to the first activation command, displaying in a second field area a sequence of tiles configured to show a listing of programming channels, each of the tiles being positioned along a first side of the display window, the sequence of tiles including a first tile displayed in a first region of the second field area, the first tile presenting a first set of information about a content currently available for playback on a second programming channel, wherein the first programming channel is selected from the listing of programming channels;
    receiving, from the user input device, a first navigation command while the second field area is being displayed;
    in response to the first navigation command, displaying in a third field area a first segment extending from the first region in a first direction toward a second side of the display window that is disposed opposite to the first side, the first tile being shifted to a second region in the third field area that is different from the first region, the second region being nearer to the second side than the first region;
    receiving, from the user input device, a second navigation command while the third field area is being displayed; and
    in response to the second navigation command, expanding the third field area in the first direction such that the first tile is further shifted toward the second side, thereby lengthening the first segment to include the first tile and a second tile presenting information relating to a first future content available for viewing via the second programming channel.

2. The method according to claim 1, wherein the second field area is in the form of a bar region along an edge area of the display window, and the active content is displayed in a portion of the display window other than the second field area.

3. The method according to claim 2, wherein the bar region partially overlays the active content.

4. The method according to claim 2, wherein the bar region is one of horizontal or vertical, and the third field area is arranged perpendicular to the bar region.

5. The method according to claim 2, wherein the bar region displays current information related to content available during a current time via a plurality of programming channels included in the listing of programming channels.

6. The method according to claim 1, wherein, in response to the first navigation command, the first region displays a second set of information related to the content currently available for playback on the second programming channel that differs from the first set of information.

7. The method according to claim 1, further comprising:
receiving, from the user input device, a third navigation command while the second tile is being displayed in the third field area; and
in response to the third navigation command, further expanding the third field area in the first direction, thereby lengthening the first segment to include the first tile, the second tile, and a third tile presenting information relating to a second future content available for viewing via the second programming channel.

8. The method according to claim 7, wherein each of the first tile, the second tile, and the third tile is of the same size independent of a duration of their respective content.

9. The method according to claim 8, wherein the first tile includes a status bar showing a progress of the current content on the second programming channel.

10. The method according to claim 1, further comprising:
in response to the second navigation command, selecting the first future content;
receiving, from the user input device, a recording command while the first future content is selected; and
in response to the recording command, selecting the first future content for at least one of identification for recording, display of a reminder, future display, recording and/or for storage in a memory.

11. The method according to claim 1, wherein:
the sequence of tiles further includes a third tile displayed in a third region of the second field area, the third tile displaying information about a content currently available for playback on a third programming channel; and
the method further comprises:
displaying a fourth tile presenting information relating to a second future content available for viewing via the second programming channel in the third field area,
receiving, from the user input device, a third navigation command, in response to the third navigation command, selecting the second future content, receiving, from the user input device, a fourth navigation command while the second future content is selected, and in response to the fourth navigation command:
displaying in a fourth field area a second segment extending from the third region in the first direction, the second segment including the third tile, a fifth tile relating to a third future content available for viewing via the third programming channel, and a sixth tile relating to a fourth future content available for viewing via the third programming channel, and
selecting the fourth future content based on a period of time that the fourth future content is available for playback containing a start time for the second future content, wherein a start time for the fourth future content is different from the start time for the second future content.

12. A non-transitory computer readable medium including instructions which, when executed by one or more processors, causes the one or more processors to perform the method of claim 1.

13. A system comprising:
one or more processors; and one or more non-transitory computer readable media including instructions which, when executed by the one or more processors, cause the one or more processors to:
display in a display window on a display device a first field area configured to display active content associated with a first selected programming channel;
receive, from a user input device, a first activation command;
in response to the first activation command, display in a second field area a sequence of tiles configured to show a listing of programming channels, each of the tiles being positioned along a first side of the display window, the sequence of tiles including a first tile displayed in a first region of the second field area, the first tile presenting a first set of information about a content currently available for playback on the second programming channel, wherein the first programming channel is selected from the listing of programming channels;
receive, from the user input device, a first navigation command while the second field area is being displayed;
in response to the first navigation command, display in a third field area a first segment extending from the first region in a first direction toward a second side of the display window that is disposed opposite to the first side, the first tile being shifted to a second region in the third field area that is different from the first region, the second region being nearer to the second side than the first region;
receive, from the user input device, a second navigation command while the third field area is being displayed; and
in response to the second navigation command, expand the third field area in the first direction such that the first tile is shifted toward the second side, thereby lengthening the first segment to include the first tile and a second tile presenting information relating to a first future content available for viewing via the second programming channel.

14. The system of claim 13, wherein the second field area is in the form of a bar region along an edge area of the display window, and the active content is displayed in a portion of the display window other than the second field area.

15. The system of claim 14, wherein the bar region partially overlays the active content.

16. The system of claim 14, wherein the bar region is one of horizontal or vertical, and the third field area is arranged perpendicular to the bar region.

17. The system of claim 13, wherein, in response to the first navigation command, the first region displays a second set of information related to the content currently available for playback on the second programming channel that differs from the first set of information.

18. The system of claim 13, wherein the instructions further cause the one or more processors to:
receive, from the user input device, a third navigation command while the second tile is being displayed in the third field area; and
in response to the third navigation command, further expand the third field area in the first direction, thereby lengthening the first segment to include the first tile, the second tile, and a third tile presenting information relating to a second future content available for viewing via the second programming channel.

19. The system of claim 18, wherein each of the first tile, the second tile, and the third tile is of the same size independent of a duration of their respective content.

20. The system of claim 19, wherein the first tile includes a status bar showing a progress of the current content on the second programming channel.

21. The system of claim 13, wherein:
the sequence of tiles further includes a third tile displayed in a third region of the second field area, the third tile displaying information about a third programming channel and a content currently available for playback on the third programming channel; and
the instructions further cause the one or more processors to:
display a fourth tile presenting information relating to a second future content available for viewing via the second programming channel in the third field area,
receive, from the user input device, a third navigation command, in response to the third navigation command, select the second future content, receive, from the user input device, a fourth navigation command while the second future content is selected, and in response to the fourth navigation command:
display in a fourth field area a second segment extending from the third region in the first direction, the second segment including the third tile, a fifth tile relating to a third future content available for viewing via the third programming channel, and a sixth tile relating to a fourth future content available for viewing via the third programming channel, and
select the fourth future content based on a period of time that the fourth future content is available for playback containing a start time for the second future content, wherein a start time for the fourth future content is different than the start time for the second future content.

* * * * *